Patented Aug. 30, 1932

1,874,695

UNITED STATES PATENT OFFICE

ACHILLE CARUGHI AND CARLO PAOLONI, OF BRESCIA, ITALY

PROCESS FOR MANUFACTURING CHLORIDE OF LIME THROUGH AZEOTROPIC DISTILLATION

No Drawing. Original application filed July 16, 1930, Serial No. 468,447, and in Italy and Germany November 25, 1929. Divided and this application filed September 29, 1931. Serial No. 565,920.

This application is a division from our copending application Serial No. 468,447 filed July 16, 1930.

According to my application filed January 22, 1929, Serial No. 334,295, Pat. No. 1,824,656, Sept. 22, 1931, a high grade and stable chloride of lime can be manufactured by suspending hydrated lime in a solvent adapted to dissolve chlorine, such as for instance the carbon tetrachloride which is indifferent both to chlorine and to lime and to chloride of lime, and by causing the said lime to react with the chlorine. During this chlorination the temperature is maintained at about 40° C. and the reaction product is reduced into very fine conditions by stirring and grinding, and the resulting pulp at the end of the reaction is quickly cooled down at room temperature. In this manner a hydrated chloride of lime is obtained which contains, chemically bound, the water that is formed in the reaction of chlorine on the hydrated lime (crystallization water). The product may also contain a slight amount of free water originated from the moisture content of lime and of chlorine gas. The aggregate amount of water generally ranges from 8 to 12%.

It is well known that, in view of the stability of chloride of lime, it is of paramount importance to free its molecule from the constitution water and from the free water.

The present invention has for its object to dehydrate the chloride of lime, obtained according to the cited previous application, directly after it has been produced so that without decomposition and without any waste of chlorine gas—an anhydrous chloride of lime is obtained which is very stable during storage and at high temperatures.

If, after the chloride of lime has formed in the carbon tetrachloride and is still suspended therein, this suspension is heated to boiling point, the carbon tetrachloride evaporates and carries off by azeotropic distillation the water contained in the chloride of lime. By condensing the vapours, the water is separated from the carbon tetrachloride, owing to the water having a lower density than, and being insoluble in carbon tetrachloride.

The separated carbon tetrachloride is continually returned to the boiling pulp until the chloride of lime has given off its water completely.

As soon as this point is reached, the anhydrous chloride of lime thus obtained is freed from the carbon tetrachloride by distillation under vacuum at low temperature. The resulting chloride of lime is perfectly anhydrous and, like the hydrated chloride of lime obtained through chlorination of the hydrated lime suspended in carbon tetrachloride, is homogeneous and crystalline but its anhydrous state secures a higher content of available chlorine and a considerable stability.

*Example*

60 parts of hydrated lime are suspended in 350 parts of carbon tetrachloride, 40 parts of chlorine are introduced and the whole is stirred and ground. Directly after this, the suspension is heated to boiling point (75–77° C.) and the vapours, consisting in an azeotropic mixture of a large amount of tetrachloride with a small amount of water, are conveyed to a condenser (mounted outside of the distilling apparatus). The water floats on the tetrachloride and is separated therefrom in any suitable device (for instance in a Florentine bottle) while the tetrachloride automatically returns to the boiling suspension. After about an hour it will be found that the chloride of lime is completely dehydrated and freed from 9 to 10 parts of water.

The dehydration is now stopped and the anhydrous chloride of lime thus obtained is freed from the carbon tetrachloride by distillation under vacuum at low temperature.

We claim:

1. A process for the manufacture of high-test, crystalline and very stable anhydrous chloride of lime which consists in freeing the hydrated crystalline chloride of lime obtained from the chlorination of hydrated lime suspended in carbon tetrachloride, from after the chlorination in carbon tetrachloride by heating the suspension to boiling point so that the carbon tetrachloride carries off the water by azeotropic distillation, and finally separating the carbon tetrachloride from this water through condensation.

2. A process for the manufacture of chloride of lime which consists in suspending about 60 parts of hydrated lime in 350 parts of carbon tetrachloride and introducing 40 parts of chlorine while stirring and grinding the mixture, heating the mixture to boiling point between 75 and 77° C., then condensing the vapours which consist of an azeothopic mixture of a large amount of tetrachloride with a small amount of water, then leading off the water and returning the tetrachloride into boiling suspension for about one hour thereby dehydrating the chloride of lime and then distilling the thus obtained chloride of lime under vacuum at low temperature in order to free it from carbon tetrachloride.

In testimony whereof we have affixed our signatures.

ACHILLE CARUGHI.
CARLO PAOLONI.